C. C. HOFER.
TRACTION APPLIANCE FOR ENGINES.
APPLICATION FILED MAY 13, 1913.
1,163,822.
Patented Dec. 14, 1915.
2 SHEETS—SHEET 1.
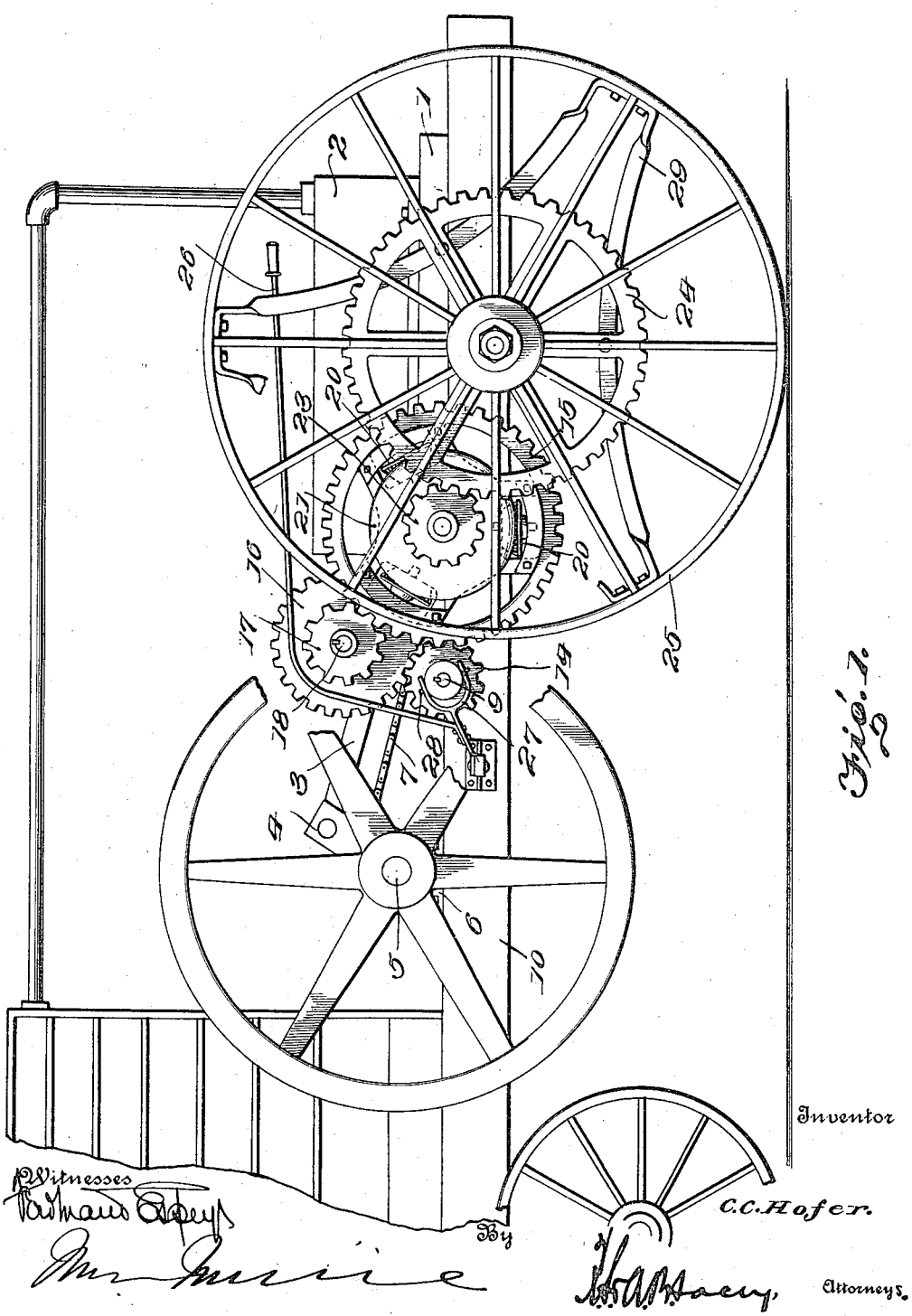

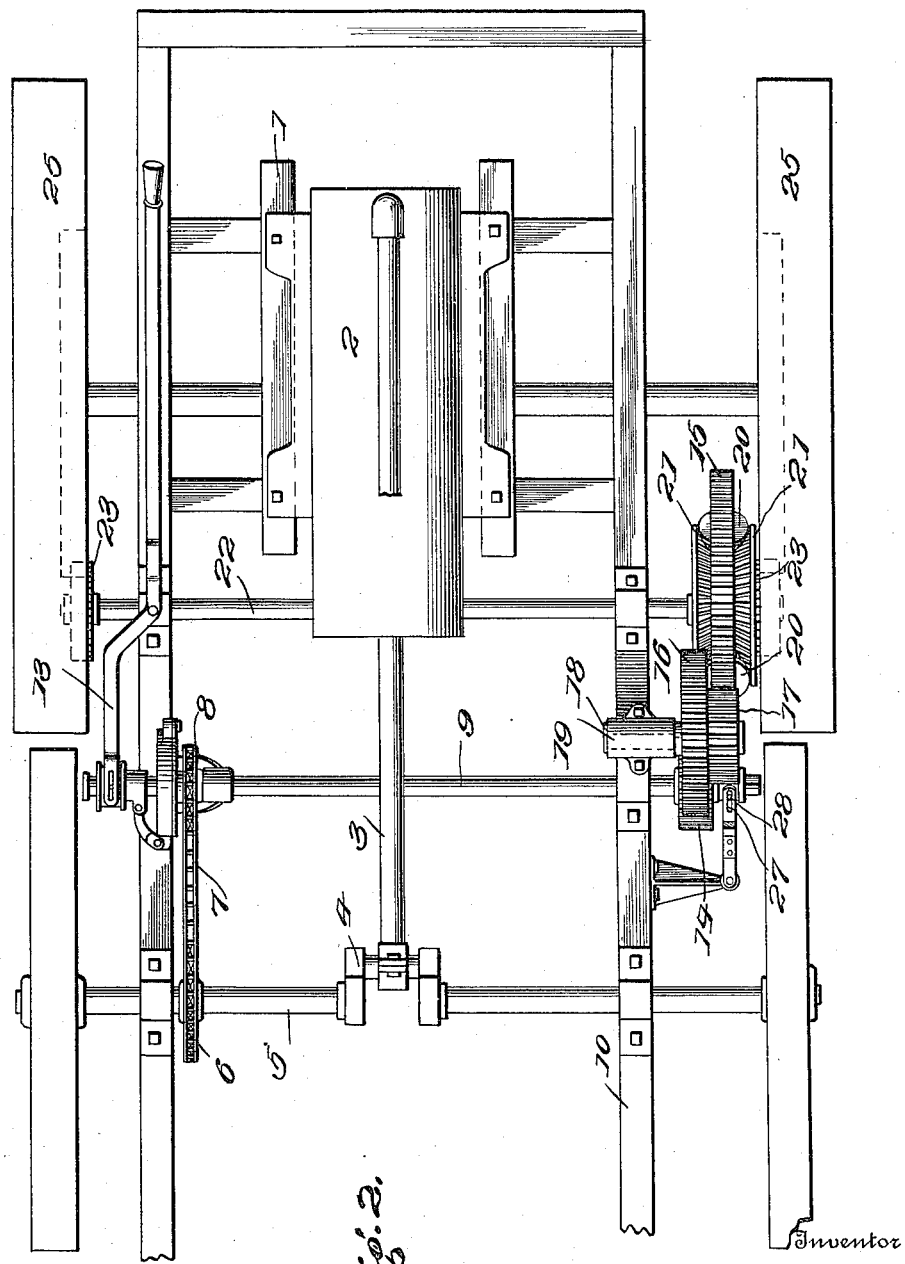

UNITED STATES PATENT OFFICE.

CLARENCE C. HOFER, OF LAKEVILLE, OHIO.

TRACTION APPLIANCE FOR ENGINES.

1,163,822.      Specification of Letters Patent.     Patented Dec. 14, 1915.

Application filed May 13, 1913. Serial No. 767,414.

*To all whom it may concern:*

Be it known that I, CLARENCE C. HOFER, citizen of the United States, residing at Lakeville, in the county of Holmes and State of Ohio, have invented certain new and useful Improvements in Traction Appliances for Engines, of which the following is a specification.

This invention relates to gearing, and has for its object the provision of a train of gearing which may be readily applied to any stationary or portable engine so as to convert the same into a traction engine.

A further object of the invention is to provide gearing which will permit the engine to travel under its own power either forwardly or backwardly as may be desired.

Further objects of the invention will appear as the description of the same proceeds.

The invention is illustrated in the accompanying drawings and consists in certain novel features which will be particularly pointed out in the claim following the description, and in the annexed drawing.

Figure 1 is a side elevation showing the gearing in position; Fig. 2 is a plan view of the same.

The engine platform or base 1 may be of any preferred construction, and in the drawings a cylinder 2 is shown mounted thereon with a pitman 3 extending from the cylinder to a crank 4 formed in or rigid with the driving shaft 5. These parts are shown conventionally and may be of any well known arrangement, the power of the engine being transmitted from the shaft 5 to the machinery to be operated.

An ordinary portable engine must be drawn from place to place by draft animals or other power and a saving of time and labor would be frequently effected if it were possible to utilize the power of the engine itself to cause it to travel. To this end, I have devised the gearing illustrated in the annexed drawings which may be fitted upon an engine without necessitating a reorganization of the operating parts of the same.

In carrying out my invention, a truck 10 equipped with traction wheels 25 is employed and the platform or base 1 with the engine thereon, is placed in position upon the truck and securely fastened thereon.

A sprocket wheel 6 is secured upon the driving shaft 5 and a chain 7 is trained around the said sprocket wheel and a similar sprocket wheel 8 which is fitted loosely upon a transmission or counter-shaft 9 journaled in suitable bearings provided in any convenient place upon the main frame. This sprocket wheel 8 is constructed to be locked to the transmission shaft by a clutch which may be of any convenient or preferred type and is controlled by a lever 13 which extends to the rear of the engine. When the clutch is disengaged from the sprocket wheel, said wheel will run idly upon the transmission shaft, and, when the clutch engages the sprocket wheel, the movement of the sprocket will be transmitted to the shaft. The transmission shaft projects laterally beyond the side of the truck frame and has slidably mounted thereon a pinion 14 which is adapted to directly engage the main gear 15 of a differential train of gearing or to mesh with the larger member 16 of a reverse gear, as will be readily understood. The reverse gear comprises the large spur wheel 16 and a smaller pinion 17 rigid therewith and mounted upon a stub-shaft 18 which is journaled in a suitable bearing 19 upon the engine frame. The smaller member 17 of this reverse gear is constantly in mesh with the large gear wheel 15 of the differential gear and when the pinion 14 meshes with the said gear 15 the reverse gear will merely run idle. If, however, the pinion 14 be shifted from engagement with the gear 15 into mesh with the member 16 of the reverse gear, the power will then be applied to the gear wheel 15 through the reverse gear and, consequently, the direction of travel of the engine will be reversed.

The differential gear comprises the large gear wheel 15, a plurality of bevel pinions 20 carried thereby and bevel gear wheels 21 mounted at opposite sides of the gear 15 and meshing with the said bevel pinions 20. The differential gear is fitted to and connects the members of the differential or driven shaft 22 which is equipped at both ends with spur pinions 23 which mesh bull-wheels 24 rigidly secured to the ground wheels 25. It will thus be seen that the power of the driving shaft 5 may be transmitted to the driven differential shaft 22 so as to rotate the ground wheels in either direction and thereby propel the engine either forwardly or backwardly. A lever 26 is mounted upon the engine frame at any convenient point and is constructed with a fork 27 adapted to engage a pin 28 on the hub of the pinion 14 whereby, if the lever be moved to one side or the other, the pinion 14 may be shifted to mesh with the reverse gear or with the gear 15. The bull-wheels 24 have secured to their outer faces a plurality of straps or brackets 29 which have their outer ends secured to inner circumferential faces of the tires or treads of the traction wheels 25.

It will be readily noted that my train of gearing occupies very little space upon the engine and, consequently, will not interfere with or necessitate any rearrangement of any of the ordinary operating parts. The several members of the gearing are of simple construction and may be readily mounted upon the engine by an unskilled person so that a stationary or portable engine may be easily and economically converted into a traction engine. When the engine is at work, the sprocket wheel 8 will be permitted to run idly upon the transmission or counter-shaft 9 and the ground wheels will, consequently, not be set in motion. If the engine is to be moved to some other point, the lever 13 is shifted to throw the clutch member into engagement with the sprocket wheel so that the transmission shaft will be rotated and, consequently, motion imparted to the ground wheels. While I have illustrated the gearing as applied to the engine frame at one side thereof, it is to be understood that the particular location is immaterial and that it may be applied at any point most convenient or suitable in the particular engine to which it is to be applied.

What I claim is:—

The combination of a driving shaft, a transmission shaft, a sprocket wheel on the driving shaft, a sprocket wheel loose upon the transmission shaft, a sprocket chain connecting said sprocket wheels, means for locking the loosely mounted sprocket wheel to the transmission shaft, a single pinion slidably mounted upon the said transmission shaft, a driven shaft, gearing on said shaft, a stub-shaft, a reverse gear carried by said shaft and having a member in constant engagement with the gearing on the driven shaft, and means for shifting the slidable pinion on the transmission shaft in a plane parallel with the driven shaft to cause it to engage either the gearing on the driven shaft or that member of the reverse gear which is in engagement with said gearing.

In testimony whereof I affix my signature in presence of two witnesses.

CLARENCE C. HOFER. [L. S.]

Witnesses:
M. L. HOFER,
J. F. DERR.

Copies of this patent may be obtained for five cents each, by addressing the "Commissioner of Patents, Washington, D. C."